United States Patent Office 3,382,252
Patented May 7, 1968

3,382,252
9-METHYL-3,4,5,6-DIBENZOXANTHENE-
9-PROPIONIC ACID
E. Holmen Reynold, White Bear Township, Ramsey County, Minn., assignor to Minnesota Mining and Manufacturing Company, St. Paul, Minn., a corporation of Delaware
No Drawing. Filed Apr. 20, 1955, Ser. No. 502,742
1 Claim. (Cl. 260—335)

This invention relates to a new and highly useful class of bisphenol (bisphenolic) compounds containing phenolic radicals and additional functional groups providing for increased reactivity and other valuable properties. The invention specifically concerns a derivative of such a bisphenolic compound. The particular bisphenolic compound of which it is a derivative is gamma,gamma-bis(4-hydroxyphenyl)valeric acid which is the central feature of Bader U.S. Patent No. 2,933,520 and is there sometimes designated 4,4-bis(4-hydroxyphenyl)pentanoic acid.

Gamma,gamma-bis(4-hydroxyphenyl)valeric acid and analogous bisphenolic compounds are readily produced by reaction, in the presence of a mineral acid catalyst, between (1) a phenol and (2) an oxocarboxylic or keto acid or ester in which a keto group is connected to a carboxy or carboalkoxy radical through an alkylene radical of at least two carbon atoms. Such keto compounds are readily available and are highly stable both under acid conditions and at elevated temperature whether in the form of the carboxylic acid or the ester. Levulinic acid is a preferred example and, since this compound is readily available, it or its alkyl esters is employed in the exemplary but non-limitative formulas and procedures hereinbelow set forth.

Levulinic acid is a gamma-keto acid, i.e. the alkylene radical connecting the keto group and the carboxyl group is an ethylene radical. It is found that at least two carbon atoms are necessary in the connecting carbon chain in order to obtain the desired high rate of reactivity between the keto acid and the phenol. Furthermore, the bisphenol compounds thus obtained are readily reactive at the carboxyl radical with alcohols or other acid-reactive compounds of a high degree of molecular complexity.

The intermediate alkylene radical may be either a polymethylene radical such as a propylene or preferably an ethylene radical, or may be an alkyl-substituted polymethylene radical such as an ethyl ethylene radical. Compounds of the latter type, viz., alpha-alkyl-gamma-oxocarboxylic acids, are readily prepared from alpha-halogen aliphatic acids and sodium acetoacetic esters or acetylacetonates.

As indicated in the formula, levulinic acid has a 5-carbon-atom skeletal chain, and thus has a terminal methyl group attached to the keto carbon atom. Analogous keto acids in which other hydrocarbon radicals replace the terminal methyl group of levulinic acid are known and are contemplated for use in the preparation of novel bisphenol acids and derivatives in accordance with the principles of this invention. Licanic acid obtained from oiticia oil, or preferably the corresponding saturated gamma-keto acid, is one example of such a material.

Preparation of γ,γ-bis(4-hydroxyphenyl)valeric acid

| | | G. |
|---|---|---|
| Phenol | (0.2 mol) | 18.8 |
| Levulinic acid | (0.05 mol) | 5.8 |
| Calcium chloride | | 7.0 |
| Conc. hydrochloric acid | | 0.17 |
| Mercaptoacetic acid | | 0.06 |

The phenol was dissolved in the levulinic acid to which was added the calcium chloride, hydrochloric acid and mercaptoacetic acid. Solution was hastened by slight warming. After ten days at room temperature, the viscous reaction mixture was poured into water, dissolved in ether and extracted with dilute aqueous sodium bicarbonate. Acidification of the combined bicarbonate extracts yielded a viscous water insoluble resin. This was dissolved in ether; some ethanol and benzene were added; and the solution was evaporated to dryness in a current of air, with heating. The pale amber solid resinous product was identified as γ,γ-bis(4-hydroxyphenyl)valeric acid having the following formula:

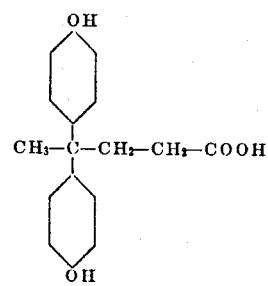

*Analysis.*—Calculated for $C_{17}H_{18}O_4$: C, 71.3; H, 6.3. Found: C, 71.1; H, 6.4.

The glassy form of this compound melts under 100° C., but, from solution, crystalline forms can be obtained either with solvent of crystallization or without, the solvated forms usually being obtained at room temperature. The solvated forms, when heated rapidly melted considerably lower than the anhydrous form which melted at 173–174° C. By slow cautious heating of the solvated forms, it was often possible to drive off the solvent at a lower temperature without concurrent melting. Crystals deposited from solution in a mixed solvent such as ethyl acetate-carbon tetrachloride often exhibited two unsharp melting points, each followed by resolidification.

It should be noted that a considerable excess of phenol was used, mostly because of the favorable effect on the reaction and the ease with which phenol can be removed from the condensation product. However, it is unnecessary that the phenol be present in excess; and, in fact, an excess of the levulinic acid could be used, if preferred.

Considerable latitude is permissible in the composition of the mixture from which γ,γ-bis(hydroxyphenyl)valeric acid is obtained, both as to choice of reactive agents and as to amounts.

The condensation of phenols with levulinic acid to give the γ,γ-bisphenolic substituted valeric acids of this invention was also carried out using as catalyst aqueous hydrochloric acid of concentrations varying from 37% (ordinary concentrated hydrochloric acid) down to about 8%. In these instances the quantities of concentrated hydrochloric acid used in the reaction mixture approximated the weight of levulinic acid used, and the reactions were run at reflux temperature (about 93–108° C.) for 20–24 hour periods.

Alternatively, sulfuric acid catalyst (of 80% or lower concentration) was also employed at room temperature. Shorter reaction times are often possible with sulfuric acid, but hydrochloric acid is more conveniently removed after completion of the reaction.

Mercaptoacetic acid is one of a number of sulfur compounds which may be utilized to speed up the reaction of a phenol with the oxocarboxylic acids. Other compounds with which it may be replaced include hydrogen sulfide and mercaptopropionic acid. In fact, the reaction will proceed without the use of auxiliary catalysts but at a slower rate.

Example.—9-methyl-3,4,5,6-dibenzoxanthene-9-propionic acid

A solution of alpha-naphthol (14.4 grams), levulinic acid (5.8 grams) and mercaptoacetic acid (0.5 gram) in glacial acetic acid (10 ml.) was saturated with dry hydrochloric acid. After standing about a week at room temperature the reaction mixture was filtered, leaving 8.5 grams of colorless crystalline product. After vacuum drying at 150° C. and 1 mm. Hg pressure, the crystals melted at 244° C. with some prior sintering. The product is thought to have the following structure:

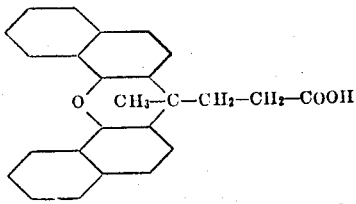

In this case, a molecule of water was lost from the bisphenolic intermediate, with the resulting formation of an ether linkage.

Analysis.—Calculated for $C_{25}H_{20}O_3$: C, 81.5; H, 5.4. Found: C, 81.1; H, 5.5.

The bisphenolic acids and products obtained therefrom may be utilized in a variety of ways such as for antioxidants, germicides and fungicides, agricultural chemicals (growth regulators), plasticizers, lubricants, low adhesion backsizes, coupling agents, casting and molding resins and as intermediates in the production of epoxy compounds. The compounds of this invention are also valuable intermediates for the preparation of paper and textile treating materials. The derivatives of the carboxyl function provide points of attachment to the fiber. Halogenation and nitration of products of this invention may be carried out to enhance certain types of activity such as fungicidal, bactericidal, and herbicidal functions.

It should also be noted that the aromatic rings of the bisphenolic acids and compounds obtainable therefrom may be reduced catalytically to give the cycloaliphatic analogs thereof.

I claim:

1. The compound 9-methyl-3,4,5,6-dibenzoxanthene-9-propionic acid having the structure

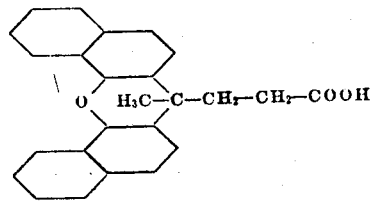

References Cited
UNITED STATES PATENTS 2,933,520   4/1960   Bader _____ 260—559

WILLIAM H. SHORT, *Primary Examiner.*

MILTON STERMAN, I. MARCUS, HERBERT J. LIDOFF, PHILLIP MANGAN, *Examiners.*

N. S. RIZZO, R. J. BETTERMARK, J. W. ADAMS, E. K. MERKER, A. L. LIBERMAN, J. T. BROWN, J. C. MARTIN, M. GOLDSTEIN, *Assistant Examiners.*

UNITED STATES PATENT OFFICE
CERTIFICATE OF CORRECTION

Patent No. 3,382,252                        May 7, 1968

Reynold E. Holmen

It is hereby certified that error appears in the above numbered patent requiring correction and that the said Letters Patent should read as corrected below.

In the heading to the printed specification, line 4, for "E. Holmen Reynold" read -- Reynold E. Holmen --.

Signed and sealed this 27th day of May 1969.

(SEAL)
Attest:

Edward M. Fletcher, Jr.

Attesting Officer

Commissioner of Patents